US006335850B1

(12) United States Patent
Dunfield et al.

(10) Patent No.: US 6,335,850 B1
(45) Date of Patent: Jan. 1, 2002

(54) MICROACTUATOR FOR FINE POSITIONING IN A DISC DRIVE

(75) Inventors: John Charles Dunfield, Santa Cruz; Gunter Karl Heine, Aptos, both of CA (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/497,688

(22) Filed: Feb. 4, 2000

Related U.S. Application Data

(63) Continuation of application No. 09/160,593, filed on Sep. 25, 1998.

(51) Int. Cl.$^7$ ................................. G11B 5/56
(52) U.S. Cl. .................................. 360/294.5
(58) Field of Search ................... 360/104, 106, 360/109, 274, 294.2, 294.3, 294.4, 294, 5

(56) References Cited

U.S. PATENT DOCUMENTS 5,745,319 A * 4/1998 Takekado ................... 360/104

OTHER PUBLICATIONS

IBM Technical Disclosure Bulletin, vol. 26, No. 2, Jul. 1983, pp. 846–849.

* cited by examiner

*Primary Examiner*—A. J. Heinz
(74) *Attorney, Agent, or Firm*—Oblon, Spivak, McClelland, Maier & Neustadt, P.C.

(57) ABSTRACT

An actuator arm assembly is provided in a disc drive. The disc drive includes a disc with a surface for storing information and a first actuator for moving the actuator arm assembly relative to the surface of the disc. The actuator arm assembly includes an actuator arm coupled to the first actuator, a load beam coupled to the actuator arm, a suspension coupled to the load beam and an air bearing coupled to the suspension. A transducer is mounted on the air bearing and positioned to access the surface of the disc. A second actuator is coupled to the air bearing and the load beam and is controllable to move the air bearing relative to the surface of the disc and relative to the load beam.

4 Claims, 6 Drawing Sheets

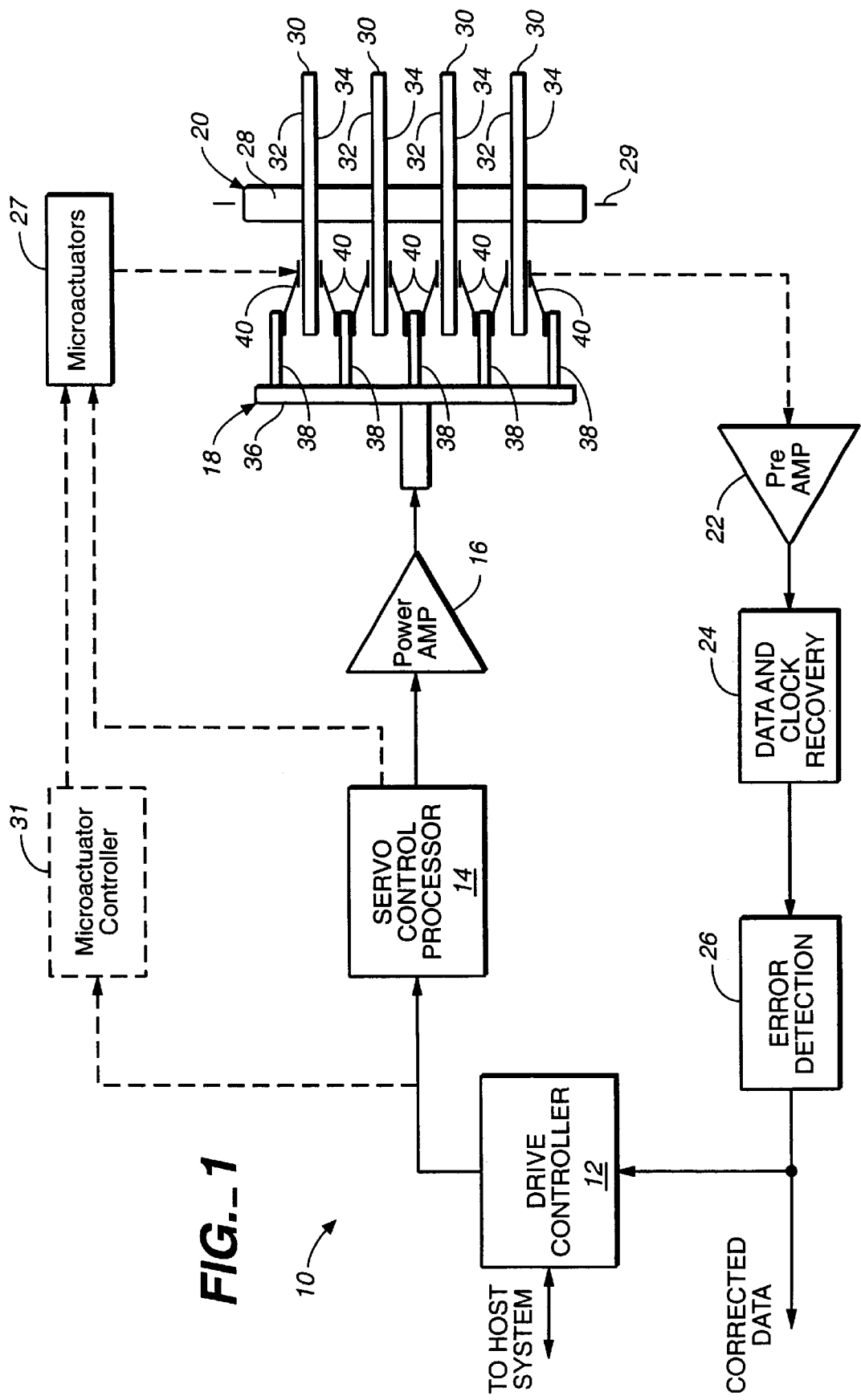
FIG._1

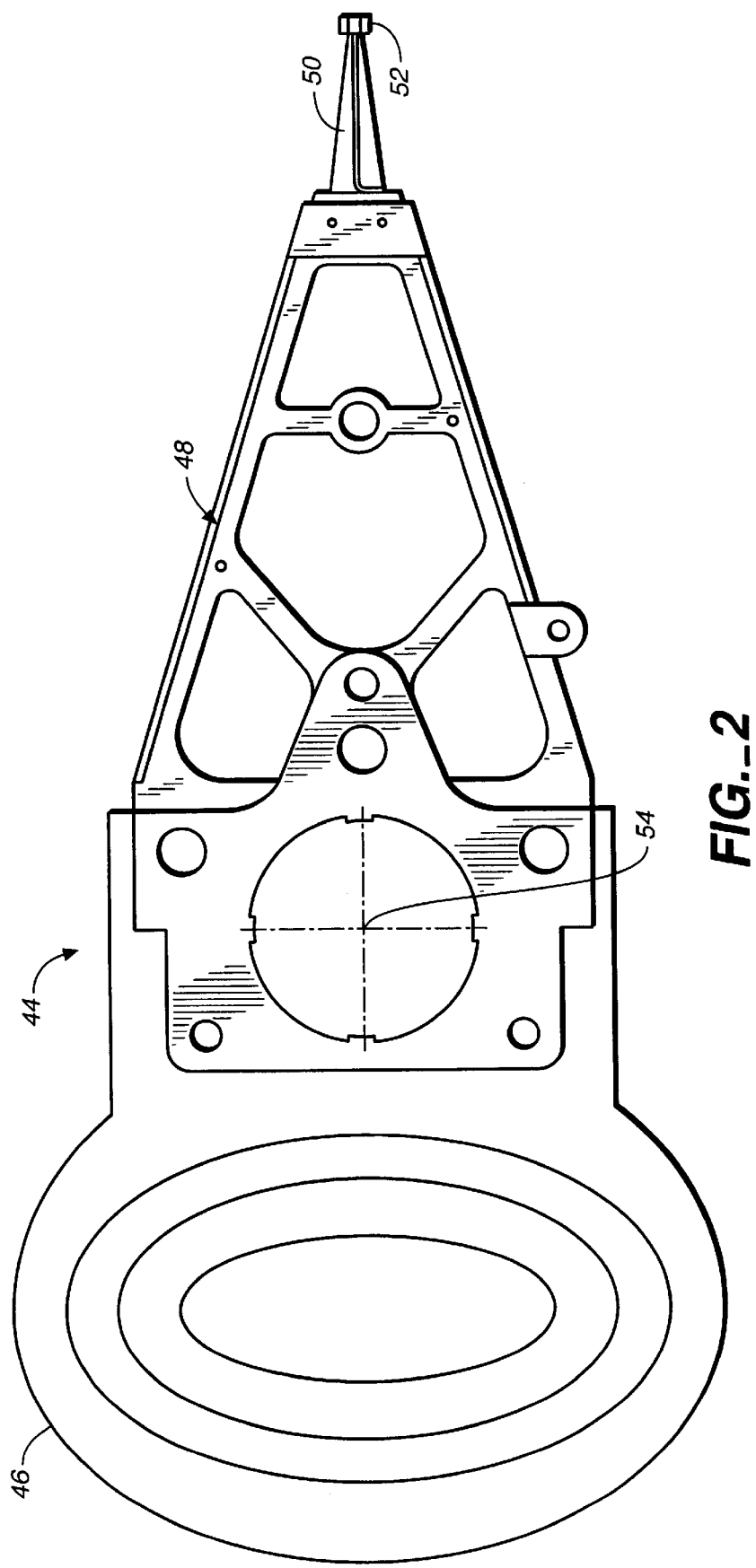
FIG._2

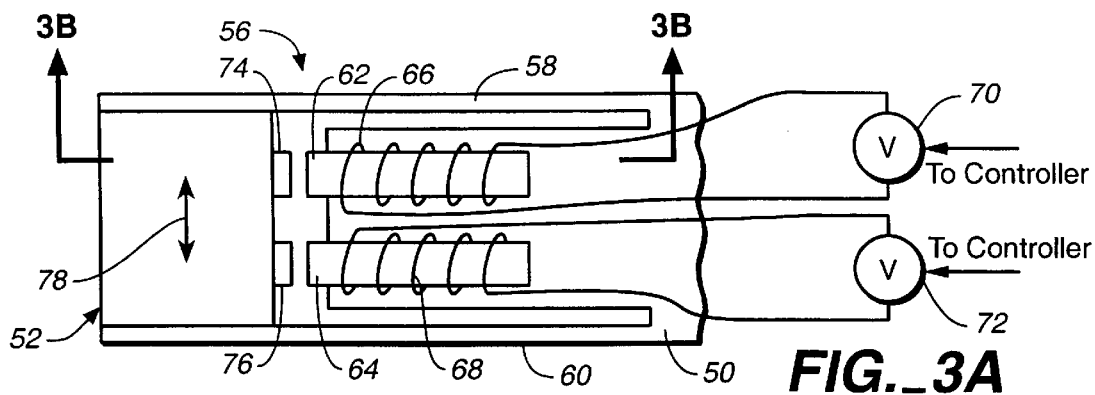
FIG._3A
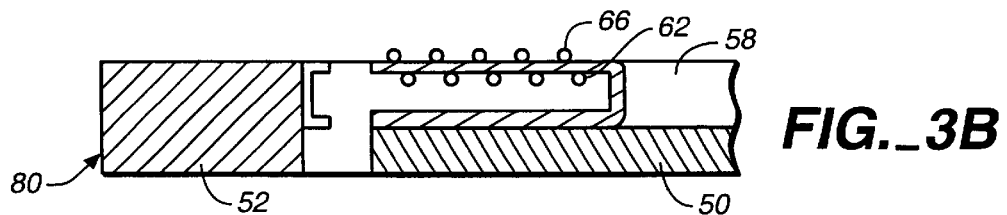
FIG._3B
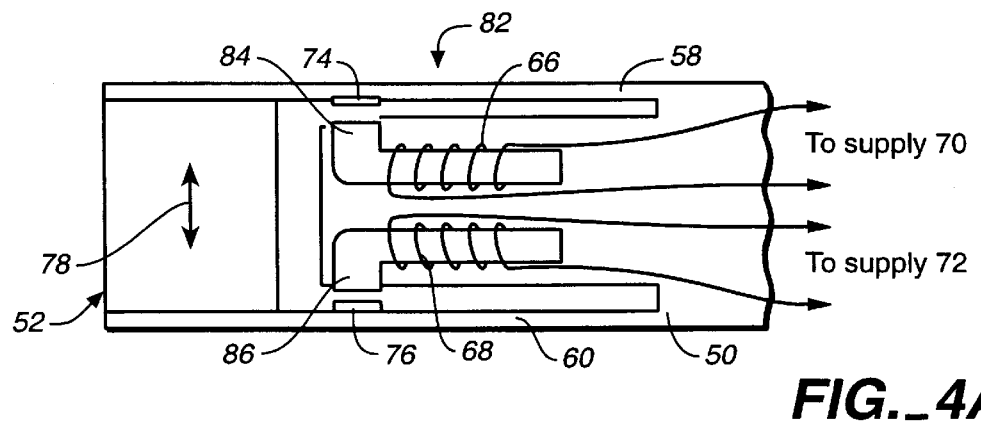
FIG._4A
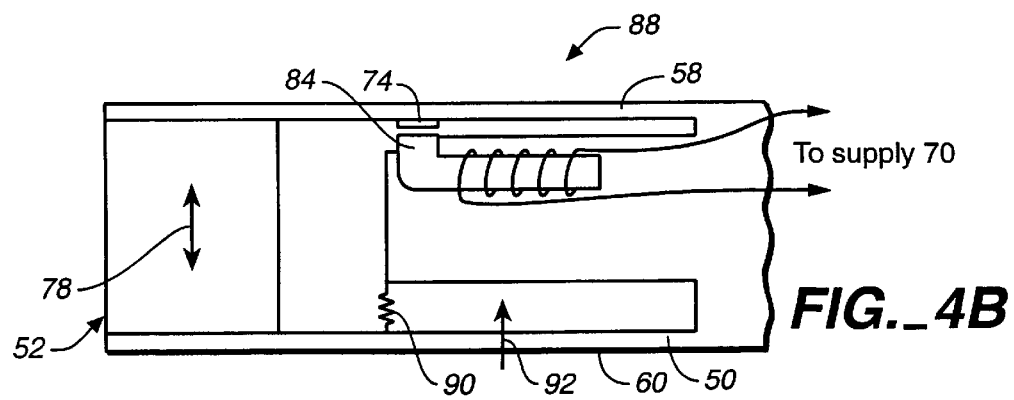
FIG._4B

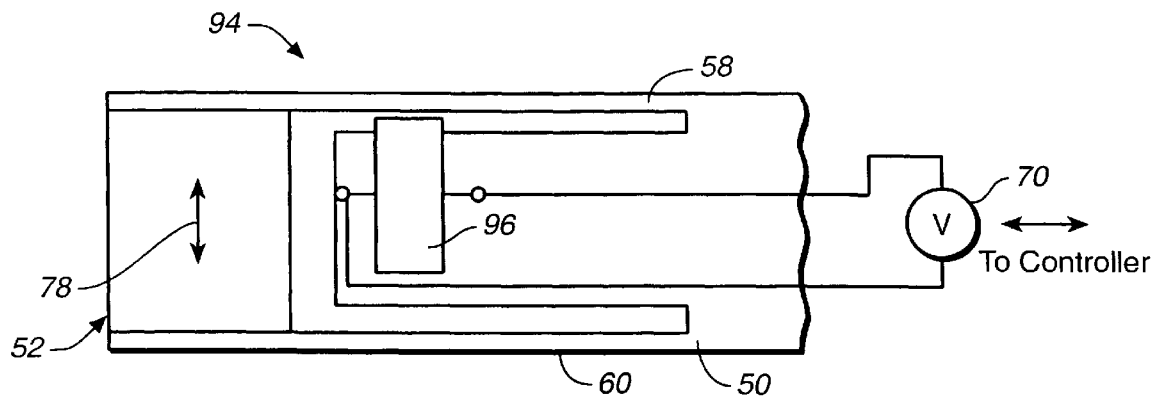
FIG._5
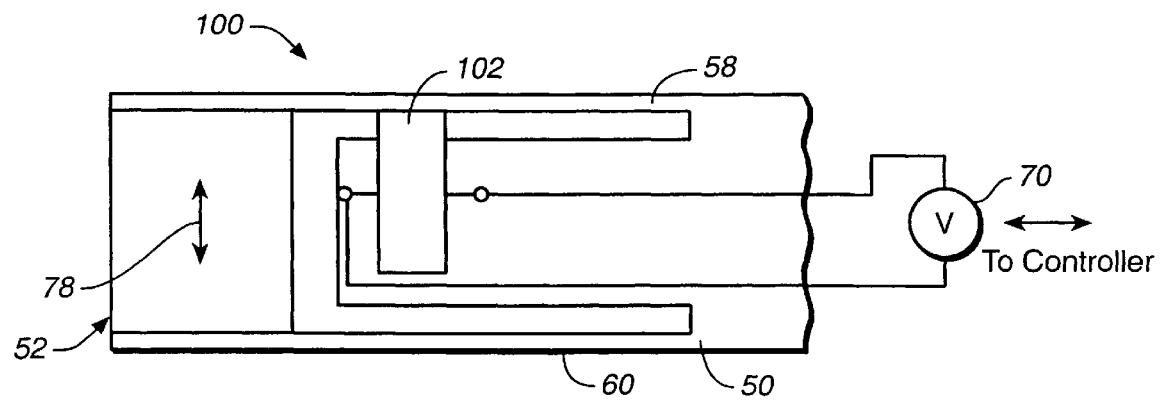
FIG._6

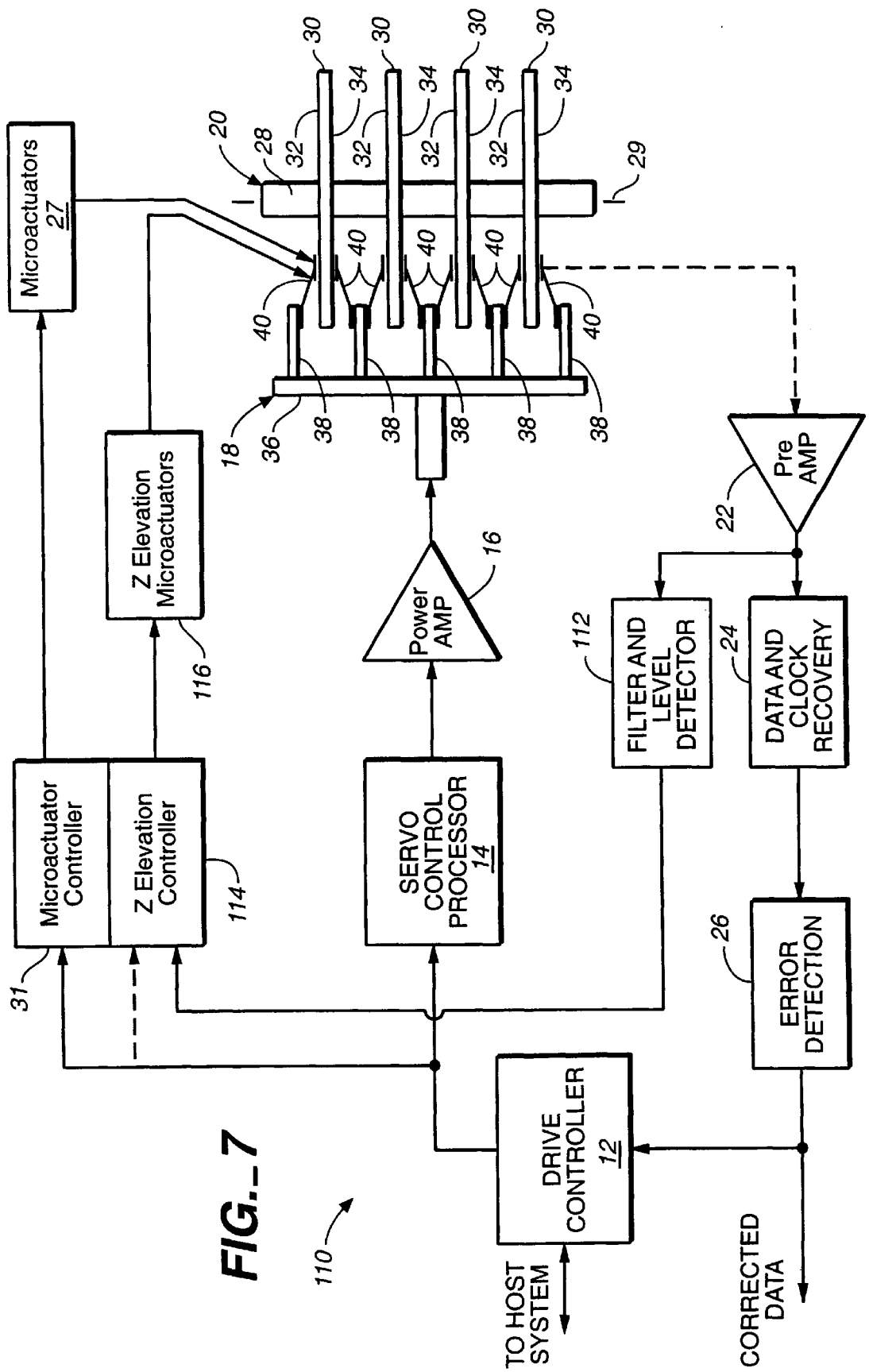
FIG._7

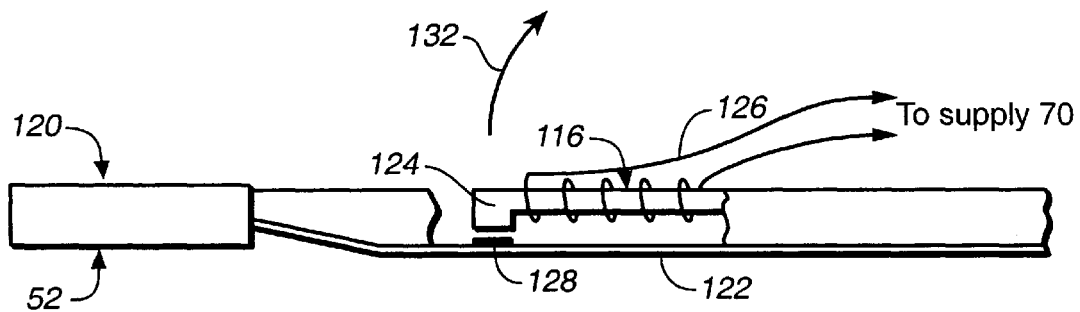
FIG._8
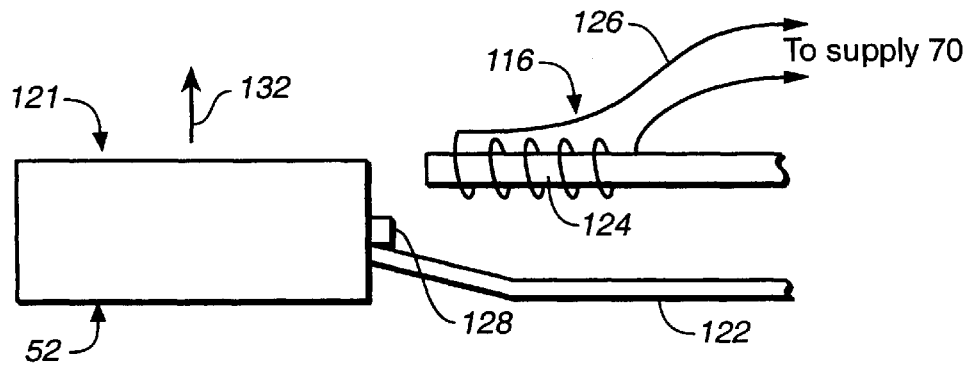
FIG._8A
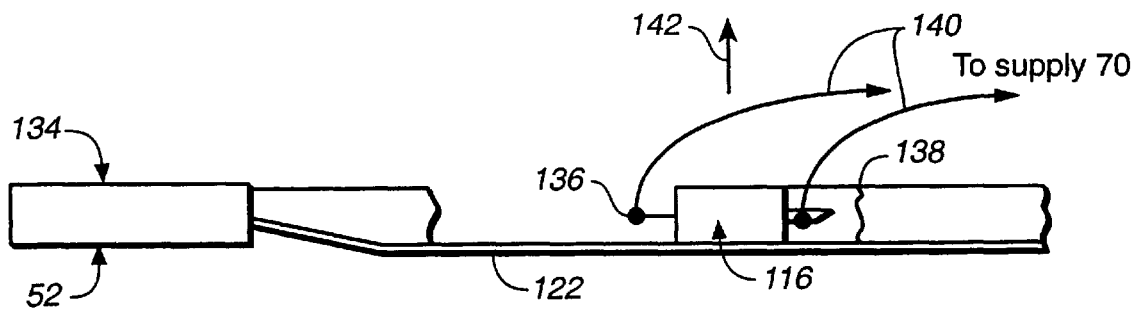
FIG._9

MICROACTUATOR FOR FINE POSITIONING IN A DISC DRIVE

This application is a continuation of Ser. No. 09/160,593, filed Sep. 25, 1998.

BACKGROUND OF THE INVENTION

The present invention deals with disc drives. More particularly, the present invention deals with positioning a transducer over a surface of a disc in a disc drive.

A typical disc drive includes one or more magnetic discs mounted for rotation on a hub or spindle. A typical disc drive also includes one or more transducers supported by a hydrodynamic air bearing which flies above each magnetic disc. The transducers and the hydrodynamic air bearing are collectively referred to as a data head. A drive controller is conventionally used for controlling the disc drive system based on commands received from a host system. The drive controller controls the disc drive to retrieve information from the magnetic discs and to store information on the magnetic discs.

An electromechanical actuator operates within a negative feedback, closed-loop servo system. The actuator moves the data head radially over the disc surface for track seek operations and holds the transducer directly over a track on the disc surface for track following operations.

Information is typically stored on the magnetic discs by providing a write signal to the data head to encode flux reversals on the surface of the magnetic disc representing the data to be stored. In retrieving data from the disc, the drive controller controls the electromechanical actuator so that the data head flies above the magnetic disc, sensing the flux reversals on the magnetic disc, and generating a read signal based on those flux reversals. The read signal is then decoded by the drive controller to recover the data represented by flux reversals stored on a magnetic disc, and consequently represented in the read signal provided by the data head.

Accurate positioning of the data head over a track on the disc is of great importance in writing data to the disc and reading data from the disc.

Recently, magnetoresistive heads (MR heads) have been implemented as data heads. MR heads are commonly referred to as dual element heads. An MR head has one transducer which is used to write data to the disc, and a separate transducer which is used to read data from the disc (i.e., a write transducer and a read transducer). A write transducer is typically formed using thin film technology, and the read transducer is typically formed using magnetoresistive technology.

There exists an offset between the active magnetic centers of these two elements. In other words, MR heads have a spatial separation between the read and write transducers. Also, because of mask misalignment during manufacturing of an MR head, and other manufacturing and operational parameters, the read transducer and write transducer on a single MR head can be spatially separated from one another to a greater or lesser degree than otherwise desired. Thus, when the MR head is finely positioned over a track during a write operation, that same position is not the ideal track center for the MR head during a read operation. Rather, since the read transducer is spatially separated from the write transducer, the MR head must be radially moved within the track (or repositioned within the track) so that the read transducer is positioned over ideal track center.

The problem of spatial separation is further exacerbated because the skew angle (the angle of the MR head with respect to a track on the disc surface) changes for different zones on the disc. Therefore, the effective spatial separation between the read and write transducers on the MR head also changes across the disc.

Another industry trend which has exacerbated the problem of accurately positioning a read head over a disc surface, is that track densities have been increasing for many years. Increased track densities on a magnetic disc require more accurate and higher resolution positioning.

Each MR head can, however, be characterized. During characterization, the offset between the read and write transducers is determined. The present actuator systems attempt to compensate for this offset by using the voice coil actuator to move (or microjog) the data head to the desired position to compensate for this offset.

However, present actuators do present a number of problems in attempting to finely position or otherwise position a data head over a magnetic disc. Conventional actuators are limited in bandwidth to approximately 500 HZ. Further, because of various frictional parameters in the system, conventional actuators can be unable to follow disturbances as low as 150 HZ.

SUMMARY OF THE INVENTION

An actuator arm assembly is provided in a disc drive. The disc drive includes a disc with a surface for storing information and a first actuator for moving the actuator arm assembly relative to the surface of the disc. The actuator arm assembly includes an actuator arm coupled to the first actuator, a load beam coupled to the actuator arm, a suspension coupled to the load beam and an air bearing coupled to the suspension. A transducer is mounted on the air bearing and positioned to access the surface of the disc. A second actuator is coupled to the air bearing and the load beam and is controllable to move the air bearing relative to the surface of the disc and relative to the load beam.

BRIEF DESCRIPTION OF THE DRAWINGS

FIG. 1 is a block diagram of a portion of a disc drive according to the present invention.

FIG. 2 illustrates an actuator arm assembly according to the present invention.

FIG. 3A illustrates one embodiment of the present invention using an electromagnetic microactuator.

FIG. 3B is a sectional view of the microactuator shown in FIG. 3A.

FIG. 4A illustrates another embodiment of the present invention using a second electromagnetic microactuator.

FIG. 4B is another embodiment of a microactuator according to the present invention.

FIG. 5 illustrates yet another embodiment of the present invention utilizing an electrostatic microactuator.

FIG. 6 illustrates another embodiment of the present invention using a microactuator formed of lead zirconate titanate (PZT) material.

FIG. 7 is a block diagram of a portion of a disc drive according to a second embodiment of the present invention.

FIGS. 8 and 8A show a head gimbal assembly utilizing an electromagnetic microactuator for movement in an axial direction.

FIG. 9 illustrates another embodiment of the present invention using a microactuator formed of electrostatic or lead zirconate titanate (PZT) material for movement in an axial direction.

DETAILED DESCRIPTION OF THE PREFERRED EMBODIMENTS

FIG. 1 is a block diagram of disc drive 10 according to the present invention. Disc drive 10 includes drive controller 12, servo control processor 14, power amplifier 16, actuator assembly 18, disc stack assembly 20, preamplifier 22, data and clock recovery circuit 24, error detection circuit 26, a plurality of microactuators illustrated generally at 27 and, optionally, a microactuator controller 31. Drive controller 12 is typically a microprocessor, or digital computer, and is coupled to a host system or another drive controller which controls a plurality of drives.

Disc stack assembly 20 includes spindle 28 which supports a plurality of coaxially arranged discs 30. The discs 30 are mounted for rotation with spindle 28 about axis of rotation 29. Each of the discs 30 has a first surface 32 and a second surface 34. Surfaces 32 and 34 both include concentric tracks for receiving and storing data in the form of flux reversals encoded on the tracks. A group of tracks which includes one track per surface 32 and 34, wherein each track in the group is located a common radial distance from the inner diameter of the corresponding disc 30 upon which it resides, is referred to as a cylinder.

Actuator assembly 18 includes an actuator 36 supporting a plurality of actuator arms 38. Each of the actuator arms 38 is rigidly coupled to at least one head assembly 40. Each head assembly 40 includes a load beam, or a flexure arm, rigidly coupled to actuator arm 38 at a first end thereof, and to a suspension or gimbal at a second end thereof. The suspension is, in turn, coupled to a hydrodynamic air bearing which supports a data head (a read transducer and a write transducer) above the corresponding disc surface, 32 or 34, for accessing data within the tracks on the disc surface.

Actuator 36 is rotatably mounted with respect to the discs 30. Actuator 36 typically includes a voice coil which interacts with a magnet to produce the selective rotation of actuator 36. As actuator 36 rotates, it moves the transducers coupled to the head assemblies 40 either radially inward on disc 30, or radially outward on disc 30. In this way, actuator 36 positions the transducers on head assemblies 40 over a desired track (and cylinder) on the discs 30.

The present invention also includes a plurality of microactuators shown in block form in FIG. 1 and designated generally by numeral 27. Each head assembly is coupled to a microactuator 27 which is, in turn, coupled to the load beam. As will be described later in the specification, the microactuator 27 is used for finely positioning head assemblies 40 within a track on discs 30.

In operation, drive controller 12 typically receives a command signal from a host system which indicates that a certain portion of a disc 30 on disc stack assembly 20 is to be accessed. In response to the command signal, drive controller 12 provides servo control processor 14 with a position signal which indicates a particular cylinder over which actuator 36 is to position the head assemblies 40. Servo control processor 14 converts the position signal into an analog signal which is amplified by power amplifier 16 and is provided to actuator assembly 18. In response to the analog position signal, actuator assembly 18 positions head assemblies 40 over a desired cylinder.

Head assembly 40 generates a read signal containing data from a selected portion of the disc to be read. The read signal is provided to a preamplifier 22 which amplifies the read signal and provides it to a data and clock recovery circuit 24. Data and clock recovery circuit 24 recovers data, which is encoded on the disc surface when the data is written to the disc surface. The data is recovered from the read signal provided by preamplifier 22. Data and clock recovery circuit 24 operates in a known manner.

Once the data is recovered, it is provided to error detection circuit 26, which in this preferred embodiment, is based on an error correction code (ECC) such as a Reed-Solomon code. Error detection circuit 26 detects whether any errors have occurred in the data read back from the disc. Correctable errors are corrected by error detection circuit 26 or drive controller 12, or a combination of both, in a known manner.

During head positioning, drive controller 12 provides a position signal to servo control processor 14 causing actuator assembly 18 to position the head assemblies 40 over a selected cylinder. In a sector servo positioning drive, a portion of each sector has position information which is read by the data head and provided, through the read channel, to servo control processor 14. The positioning information gives tuning feedback to the servo control processor for better positioning.

It should be noted that the present system could also be used in a dedicated servo system in which one of the surfaces, 32 or 34, of a disc 30 is dedicated to servo information. This information is used to position head assemblies 40 over a desired cylinder.

In either type of system, servo control processor 14 reacts to the position information read from the disc stack assembly 20 and positions the head assemblies 40 accordingly.

A magnetoresistive head (MR head) uses a read gap for a magnetoresistive readback element and a write gap for inductively writing magnetically encoded information to the disc. Design constraints require that the two gaps be physically separated from one another.

Performance of a dual gap magnetic head can be optimized for a particular track on a magnetic disc by aligning the write gap with the data track when writing information and aligning the read gap with the data track when reading information. Using a rotary actuator introduces a skew angle between data tracks and the axis of a dual gap head. For example, a dual gap head having 320 microinches of separation between the two gaps and a 9° skew angle relative to a data track has an offset of approximately 50 microinches. The skew changes as the data head moves from the inner diameter of the disc to the outer diameter of the disc.

Even though servo control processor 14 can compensate for the skew angle introduced by rotary actuator 18, the skew angle significantly limits the time required to write information to the discs. This limitation is due in part to the format used in storing data on the data tracks of the magnetic disc. Typically, a data track is formatted with an address field followed by a data field. The address field contains information which relates to head position and data field integrity, and therefore the address field must be read before the data field is written. Prior to writing information in the data field, the magnetic head must be repositioned because of the offset introduced by the skew angle. If rotary actuator 18 is used to reposition the head, the repositioning can require from 0.5 microseconds to 1.5 microseconds. In fact, in a high speed magnetic disc storage system such as disc drive 10 shown in FIG. 1, the drive may be required to wait an entire revolution of the disc before writing information. This adds significantly more time to the write operation.

In the preferred embodiment, the offset between the read and write transducers for each head assembly 40 is precharacterized and parameters indicative of that offset (for each head assembly 40) are stored in memory associated with servo control processor 14. Therefore, when drive controller 12 provides position information to servo control processor 14, servo control processor 14 not only acts to position actuator 18 over a desired cylinder, but servo control processor 14 also provides an analog control signal to the appropriate microactuator 27 to position the desired data head within a track to be written to, or read from, in order to overcome the offset between the read and write transducers and the skew angle. It will be appreciated that the total distance by which microactuator 27 must move the data head depends on the offset between the read and write transducers, the skew angle, and the radial position of the data head relative to the disc. As will be described later in the specification, microactuators 27 can take any suitable form, such as electromagnetic microactuators, electrostatic microactuators, or microactuators formed of lead zirconate titanate (PZT) material or similar material.

In a second embodiment of the present invention, microactuator controller 31 is provided as a separate controller dedicated to controlling microactuators 27. In this embodiment, a portion of the overhead processing required for positioning is relieved from servo control processor 14. This can provide enhanced speed performance.

FIG. 2 illustrates an actuator arm assembly 44 according to the present invention. The actuator arm assembly includes a voice coil 46 coupled to an extending actuator arm 48. The extending actuator arm 48, in turn, is coupled to load beam 50. A data head 52 is coupled by a suspension (not shown), to load beam 50. The load beam 50 has a proximal end 51 and a distal end 53. A microactuator (not shown) is coupled to the distal end 53 of the load beam 50 and to data head 52. In operation, voice coil 46 is positioned relative to a magnet such that interaction between the magnet and voice coil 46 causes controlled rotation of actuator arm assembly 44 about axis of rotation 54.

FIG. 3A is one embodiment of an electromagnetic microactuator 56. Microactuator 56 is disposed at the distal end 53 of the load beam 50. In the embodiment shown in FIG. 3A, load beam 50 has a pair of resilient cantilevered beams or arms 58 and 60 disposed along opposite sides thereof. Head assembly 52 is coupled to the cantilevered beams 58 and 60. In the preferred embodiment, head assembly 52 is coupled to beams 58 and 60 by a suitable gimbal or a suspension. However, for the sake of clarity, the suspension is not shown in FIG. 3A.

Microactuator 56 includes two pole pieces 62 and 64, each of which have been provided with a conductive coil, 66 and 68, respectively. The conductors which form coil 66 and 68 are coupled to power supplies 70 and 72, respectively. The power supplies are controllable power supplies controlled by either servo control processor 14 or microactuator controller 31 (both of which are shown in FIG. 1). Microactuator 56 also includes a pair of magnetic, interactive end members 74 and 76.

Cantilevered beams 58 and 60 are resilient and deflectable in the transverse direction indicated by arrow 78. Therefore, when a voltage is applied to either of the conductive coils 66 or 68, under known electromagnetic principles, the associated end member 74 or 76 will react in such a way as to reduce reluctance in the system. In other words, if a voltage is applied to coil 66 from supply 70, and no voltage is applied to coil 68, end member 74 will tend to align itself with the tip of pole piece 62. Further, if a voltage is applied from supply 72 to coil 68, and no voltage is applied to coil 66, end member 76 will tend to align itself with the tip of pole piece 64. Assuming such alignment forces are strong enough, cantilevered beams 58 and 60 will deflect in the direction indicated by arrow 78 under the alignment force. This results in a repositioning of head assembly 52 relative to the disc surface over which it is flying and relative to load beam 50.

It can be seen in FIG. 3A that the positioning of head assembly 52 is based on a differential between the voltages applied to coils 66 and 68. Thus, very fine and accurate positioning can be obtained by tightly controlling the voltage differential applied to coils 66 and 68.

FIG. 3B is a side sectional view taken along section lines 3B—3B shown in FIG. 3A. Pole pieces 62 and 64 are substantially identical, and FIG. 3B shows that pole piece 62 is a generally unshaped piece which has one extending portion thereof connected to load beam 50 by welding, adhesive or another suitable method. FIG. 3B also shows that head assembly 52 carries read and write transducers collectively designated by the reference numeral 80.

In one preferred embodiment, pole pieces 62 and 64, as well as end members 74 and 76, were formed of Permalloy 78. Coils 66 and 68 were formed with 30 turns of copper wire. Pole pieces 62 and 64 were approximately 100×600× 100 microns in dimension. The gap between the end of pole pieces 62 and 64, and of the corresponding elements 74 and 76, respectively, was approximately four microns. Running a current of 100 milliamps through the coil produced a peak edge effect force of approximately $15 \times 10^{-6}$N. This produced about five microns of travel of the microactuator.

FIG. 4A shows a second embodiment of an electromagnetic microactuator according to the present invention. A number of items are similar to those shown in FIGS. 3A and 3B, and are similarly numbered. Microactuator 82 operates in a similar manner to microactuator 56 shown in FIGS. 3A and 3B, except that pole pieces 62 and 64 are replaced by pole pieces 84 and 86. Also, end members 74 and 76, which interact with pole pieces 84 and 86, are moved from head assembly 52 to the sides of cantilevered beams 58 and 60.

Pole pieces 84 and 86 are generally L-shaped. Thus, as a voltage is applied to coil 66 (and current runs through the coil), the end of pole piece 84 and member 74 are attracted to one another. Also, as a voltage is applied to coil 68, the end of pole piece 86 is attracted to member 76. Therefore, by controlling the differential voltage applied to coils 66 and 68, head assembly 52 can be very accurately positioned along the direction indicated by arrow 78.

FIG. 4B shows another embodiment of an electromagnetic microactuator 88. Microactuator 88 is substantially the same as microactuator 82 shown in FIG. 4A except that pole piece 86, coil 68, power supply 72 and member 76, have been replaced by a mechanical spring 90 having a spring constant k. Mechanical spring 90 effectively acts as a compression spring causing cantilevered beams 58 and 60 to deflect in the direction indicated by arrow 92 relative to the remainder of load beam So. Then, in order to microposition head assembly 52, only one signal need be applied—the voltage signal to coil 66. The end of pole piece 84 will then be attracted to member 74 to offset the force supplied by spring 90 and to thereby controllably microposition head assembly 52.

Of course, the materials used, the number of coils and the number of turns in the coil, the size of the materials and the magnitude of the signal (voltage or current) applied, will all depend greatly on the specific implementation desired.

FIG. 5 is another embodiment of a microactuator assembly 94 according to the present invention. The microactuator assembly 94 operates in a similar manner to microactuators 56 and 82. However, instead of having an electromagnetic actuator, microactuator 94 is provided with an electrostatic actuator 96. Electrostatic actuator 96 essentially includes a capacitor array coupled to cantilevered beam 58. When a potential is applied across the capacitor array, an electrostatic force is developed across the capacitors in the array, as is commonly known. The capacitors are formed of flexible capacitor plates separated by an air gap. As the electrostatic forces are formed across the capacitive plates, the flexible plates deflect thereby causing movement of head assembly 52 in the direction of arrow 78, depending upon the particular signal applied to the capacitive plates. Different movement lengths can be achieved by varying the amount and dimension of the variable capacitive plates used and the magnitude of the voltage applied to the plates.

FIG. 6 is another embodiment of a microactuator according to the present invention. Microactuator 100 operates in a similar manner to the other microactuators discussed herein. However, microactuator 100 is formed of a lead zirconate titanate (PZT) material 102 coupled to cantilevered beam 5B. Essentially, the PZT material is utilized as piezoelectric material. Therefore, when a voltage is applied to the material, it exerts a stress on an associated cantilevered beam to cause displacement of data head 52.

It should be noted that significant advantages can be obtained by increasing the travel range provided by the microactuators. Providing enough travel to move the transducers across a number of tracks can enable the microactuators to perform seek operations. This greatly increases the speed at which seek operations can be formed over that using the voice coil actuator.

Therefore, the present invention provides a microactuator for repositioning a data head to compensate for offsets between the read and write elements on a magnetoresistive head, skew angle between the MR head and the surface of the disc, and other misalignments between the data head and the track to be accessed on the disc. The present invention facilitates enhanced performance in disc drives generally, and also in disc drives having an extremely high track per inch (tpi) count. The microactuators described herein provide these advantages while maintaining a drive which has a very high operation bandwidth to reduce undesirable affects of non-repeatable runout (NRR). Further, the high bandwidth performance of the present microactuators renders them suitable for adaptively compensating for operating disturbances and vibrations. Also, main actuator 18 is quite slow in comparison to the microactuators 27. During a track seek operation, the microactuators can be used to more rapidly settle the heads over the surfaces of the discs. This results in more rapid head motion and settling, which decreases access times.

Finely positioning the head within a track solves a number of problems associated with prior disc drives. However, it is also desirable to provide a disc drive with the ability to adaptively position the head assemblies 40 in the Z-direction (generally defined as being parallel to axis 29). For example, both during operation, and under non-operating conditions (such as shipment), it is highly undesirable for the head to contact the disc surface under shock conditions. This is often referred to as "head slap." Contact between the head and the disc surface under shock conditions can damage the disc surface or the head rendering either or both inoperable.

Further, in disc stacks having multiple discs, a single head in the stack can have marginal flying characteristics. This often requires the entire stack to be replaced. Also, the disc surface can have disparate surface characteristics, and the fly height of the head over the disc generally varies from the outer diameter to the inner diameter because of the hydrodynamic variations along the disc surface.

The ability to adaptively vary the flying height of the head over the disc surface would substantially address all of these issues. During operating conditions, the ability to vary the flying height by even several microns would significantly improve reliability.

FIG. 7 is a block diagram of another disc drive 110 according to another embodiment of the present invention. Disc drive 110 is similar to disc drive 10 shown in FIG. 1, and similar items are similarly numbered. However, disc drive 110 also includes filter and level detector 112, Z-elevation controller 114 and Z-elevation microactuators 116. As with microactuators 27, Z-elevation microactuators 116 are shown in FIG. 7 in block diagram form. Each head assembly is preferably coupled to a microactuator 116 which is, in turn, coupled to the load bead. As will be described below, Z-elevation microactuators 116 are provided to move head assemblies 40 in a Z-direction generally parallel to axis 29.

In disc drive 110, the read signal provided by head assemblies 40 is amplified by preamplifier 22 and provided to data and clock recovery circuit 24 and error detection circuit 26 for normal processing. However, the signal is also provided to filter and level detector 112 and to Z-elevation controller 114. Based on the signal received, Z-elevation controller 114 provides a signal to Z-elevation microactuators 116 causing adjustment in the position of head assemblies 40 in the Z-direction.

In the preferred embodiment, Z-elevation microactuators 116 are combined with microactuators 27 so that fine positioning within a track, and positioning in the Z-direction, are accomplished with the same microactuator assembly.

Positioning in the Z-direction can be accomplished in a number of ways. For example, error rate profiling is preferably used to set a nominal height setting (in the Z-direction) for each head. Then, error rate data which is preferably accumulated for each drive, indicates a different Z profile across the radius of each disc 30 in order to improve or maximize performance. In other words, error rate data for various portions on the surfaces of discs 30 is used to determine an optimum flying height for each data head. This information is provided to Z-elevation controller 114 which, in turn, provides a control signal to Z elevation microactuators 116 which holds the heads at the desired Z-height for optimum error rate performance.

In addition, in another preferred embodiment various Z-height settings are used for each radial zone on the disc. Thus, zones defined by an inner radius will have different fly height settings than zones defined by an outer radius. This is also preferably used to optimize performance.

In addition, dynamic analog signals from the head can, in another preferred embodiment, be used to set the Z-height settings for microactuators 116. In that embodiment, the signal provided by preamplifier 22 is filtered and the signal level is detected by filter and level detector 112. Circuit 112 preferably includes a threshold level detector which detects signal amplitude and causes Z-elevation controller 114 to initiate and quantify desired movement in the Z-direction.

In the embodiment in which error rate is used to set the Z-height settings, the discs 30 are preferably precharacterized into error rate zones which define different nominal Z-height settings. In another embodiment, the error rate is monitored on-the-fly and the Z-height settings are adjusted based on the on-the-fly error rate levels monitored.

In a preferred embodiment, the Z-elevation microactuators 116 are preferably combined with the microactuators 27 which finely position the heads within a track. The same information used to position microactuators 116 can also be used to position microactuators 27. The microactuators have a high bandwidth, typically in excess of 5 kHz, so that both the Z-elevation adjustments and the fine radial positioning adjustments have fast enough response times to be used to compensate for non-repeatable runout. This allows a higher track per inch count on the surface of discs 30 while still allowing use of lower cost spindle motors which may have greater runout or vibration characteristics. It should be noted that the heads can either be individually positioned, or positioned as a single group or as a plurality of groups.

FIG. 8 shows an embodiment of a head gimbal assembly 120 which includes a Z-elevation microactuator 116. FIG. 8 has a portion of the load beam cut away for the sake of clarity. In a preferred embodiment, a cantilevered beam portion 122 of head gimbal assembly 120 is provided for flexure in the Z-direction. Microactuator 116 includes an electromagnetic element 124 wrapped by a coil 126. When power is applied to coil 126, it interacts with element 128 and draws element 128 upward, generally along a slight arc (but primarily parallel with axis 29) defined by arrow 132. This effectively lifts data head 52 away from the surface of disc 30.

FIG. 8A is another embodiment of a microactuator assembly according to the present invention. FIG. 8A is similar to FIG. 8, and similar parts are correspondingly number. However in the embodiment in FIG. 8A, head gimbal assembly 121 has responsive element 128 mounted to head assembly 52, and piece 124 is a straight piece with coil 126 disposed is thereabout. The application of current through conductors 126 induces a force on element 128 which causes element 128 to tend to align itself with piece 124. This causes movement of head assembly 52 generally in the direction indicated by arrow 32.

FIG. 9 illustrates another embodiment of a head gimbal assembly 134 having a microactuator 116 for movement of head 52 in the Z-direction. In the embodiment shown in FIG. 9, microactuator 116 is formed of either PZT material or electrostatic material. Microactuator 116 has a pair of terminals 136 and 138 which are coupled by conductors 140 to supply 70. When terminals 136 and 138 are energized, microactuator 116 causes movement generally in the direction indicated by arrow 142. This again causes movement of head 52 away from the surface of disc 30.

Although the present invention has been described with reference to preferred embodiments, workers skilled in the art will recognize that changes may be made in form and detail without departing from the spirit and scope of the invention.

What is claimed is:

1. A method for manufacturing a disk drive suspension, said method including the steps of:
   (a) forming a load beam having:
      (i) a rigid region;
      (ii) a first end;
      (iii) a mounting region on the first end;
      (iv) a second end;
      (v) a suspension on the second end; and
      (vi) a spring region between the mounting region and the rigid region; and
   (b) forming on the load beam at least one electromagnetic field-generating coil of an electromagnetic microactuator for causing the suspension to move along a tracking axis with respect to the mounting region.

2. A method for manufacturing a disk drive suspension including a microactuator, said method including the steps of:
   (a) forming a load beam having:
      (i) a rigid region;
      (ii) a first end;
      (iii) a mounting region on the first end;
      (iv) a second end; and
      (v) a linkage between the first end and the second end for enabling motion of the second end with respect to the first end about a tracking axis; and
   (b) forming on the rigid region at least one magnetic field-generating coil of an electromagnetic microactuator for enabling tracking motion of the second end of the load beam with respect to the first end of the load beam.

3. A method for manufacturing a disk drive suspension, said method including the steps of:
   (a) forming a load beam having:
      (i) a rigid region;
      (ii) a first end;
      (iii) a mounting region on the first end;
      (iv) a second end; and
      (v) a suspension on the second end for mounting a read/write head; and
   (b) forming a part of a microactuator:
      (i) which is in the rigid region of the load beam;
      (ii) which includes first and second magnetic field-generating structures; and
      (iii) which is responsive to tracking control signals for moving the second end of the load beam along a tracking axis.

4. A method for manufacturing a disk drive suspension, said method including the steps of:
   (a) forming a load beam having:
      (i) a rigid region;
      (ii) a first end;
      (iii) a mounting region on the first end; and
      (iv) a second end and
   (b) forming a part of a microactuator:
      (i) which is in the rigid region of the load beam;
      (ii) which includes first and second magnetic field-generating coils; and
      (iii) which is responsive to tracking control signals for moving the second end of the load beam along a tracking axis.

* * * * *